Jan. 7, 1947.  H. PURAT  2,413,783
WELDING CONTROL APPARATUS
Filed Nov. 26, 1942  5 Sheets-Sheet 4
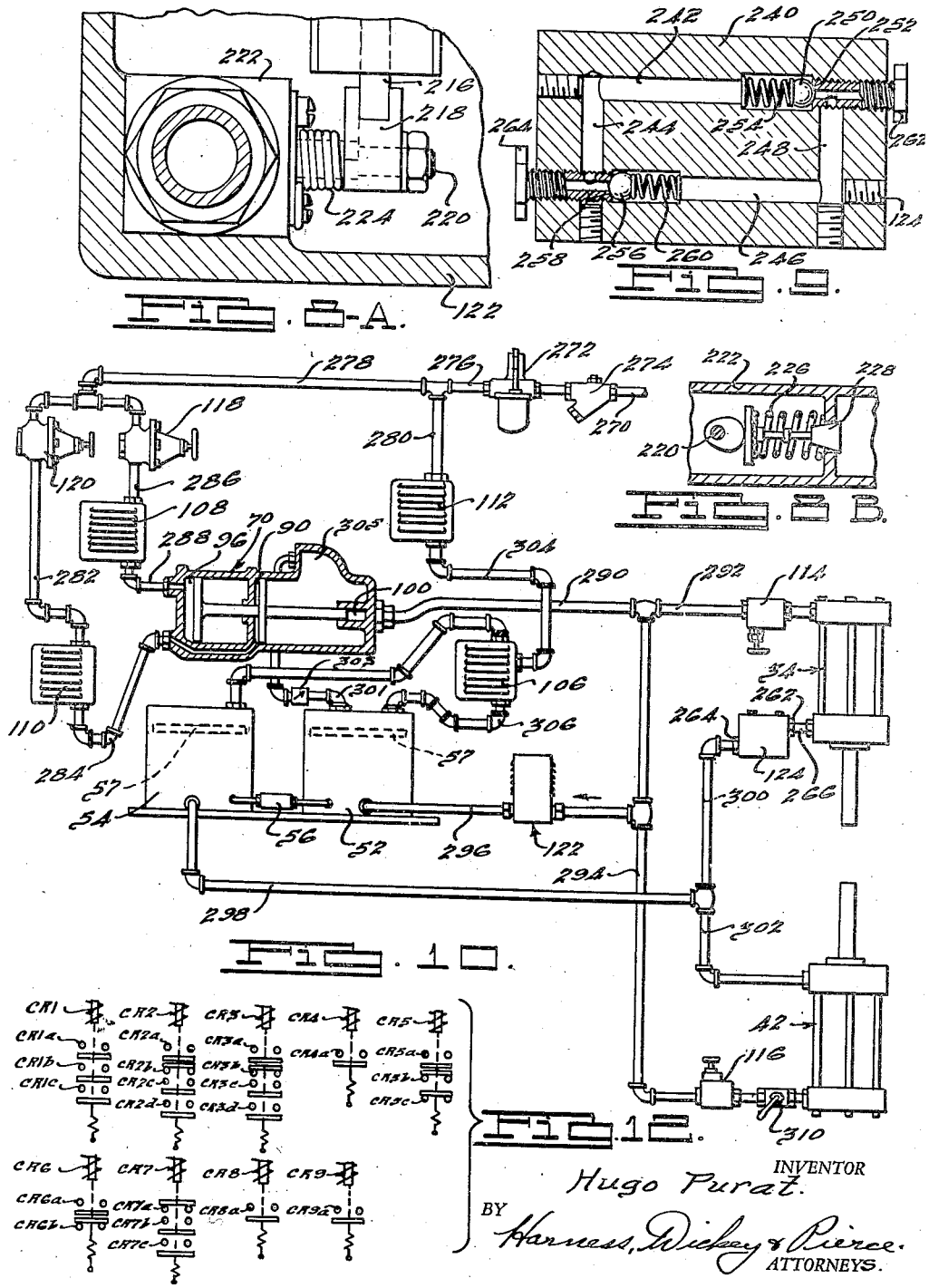
INVENTOR
Hugo Purat.
BY Harness, Dickey & Pierce.
ATTORNEYS.

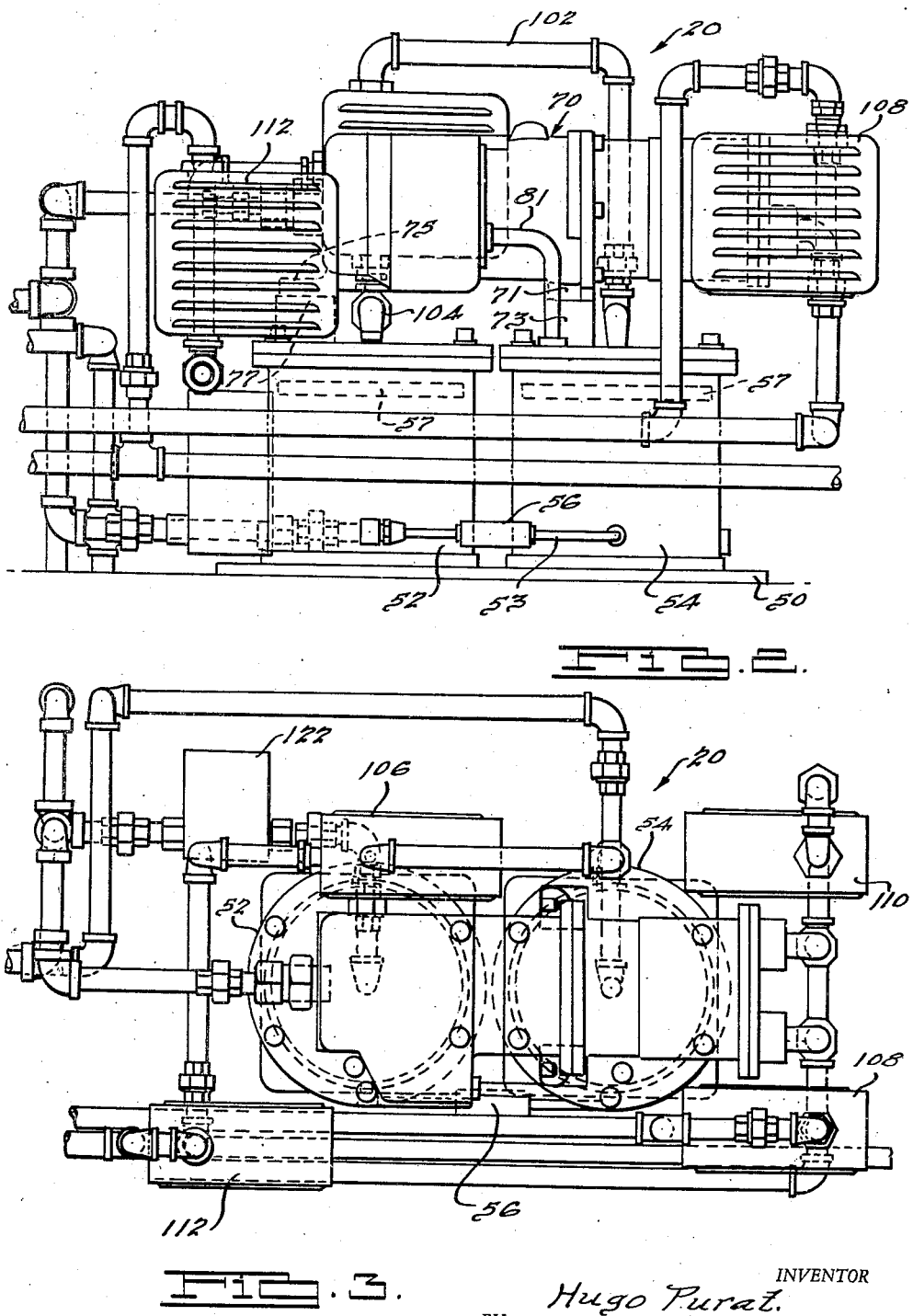

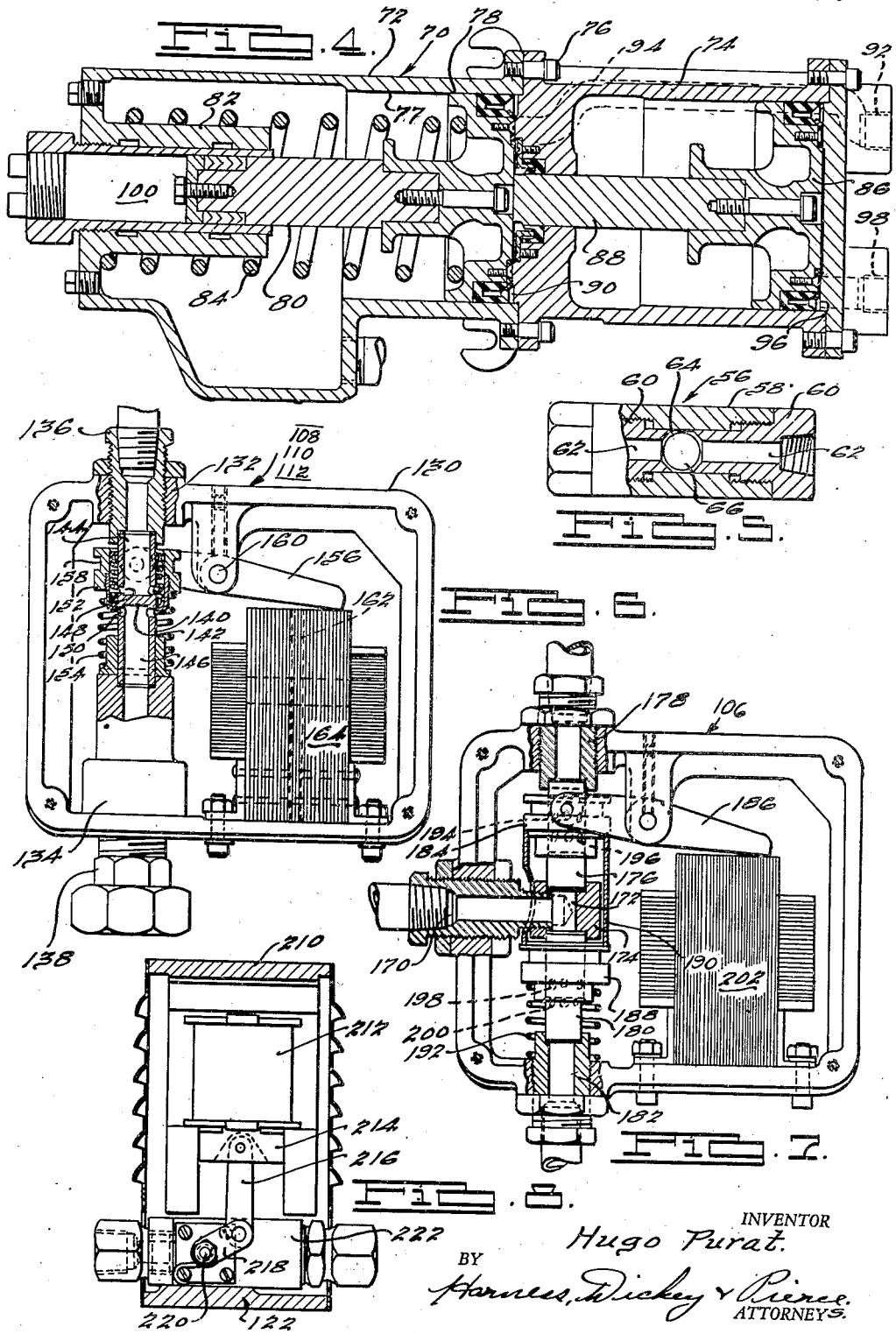

Jan. 7, 1947.  H. PURAT  2,413,783
WELDING CONTROL APPARATUS
Filed Nov. 26, 1942  5 Sheets-Sheet 5

INVENTOR
Hugo Purat.
BY Harness, Dickey & Pierce.
ATTORNEYS.

Patented Jan. 7, 1947

2,413,783

UNITED STATES PATENT OFFICE 2,413,783

WELDING CONTROL APPARATUS

Hugo Purat, Detroit, Mich., assignor to Progressive Welder Company, Detroit, Mich., a corporation of Michigan Application November 26, 1942, Serial No. 466,981

6 Claims. (Cl. 219—4)

1

The present invention relates to methods of and apparatus for controlling the movements of and pressures applied to work engaging members of various types. As specifically disclosed herein, the invention provides improved methods of and apparatus for controlling the movements of and the pressures applied between the electrodes of a resistance welding machine.

The principal objects of the invention are to provide improved methods and apparatus, as aforesaid, which may be economically manufactured and installed, and which are efficient and reliable in operation; to provide such arrangements utilizing combined pneumatic-hydraulic units associated together in such a way as to enable a desirably large range of movement of the electrodes from a retracted position to an initial work engaging position and to further enable the development of desirably higher welding pressures following such initial movement; to provide such arrangements in which one or more of the electrodes of the machine is provided with an actuating ram, disposed to be supplied through one hydraulic circuit with a hydraulic fluid to cause the movement of the electrode from a starting position to a work engaging position, and disposed to receive hydraulic pressure through another circuit to produce the actual welding pressure; to provide such arrangements in which both circuits are energized by combination pneumatic-hydraulic means and wherein at least one of the means is so arranged as to provide a succession of different pressures during the actual welding period.

Further objects of the invention are to provide a resistance welding machine having a pair of opposed electrodes, both of which are movable relative to the frame of the machine and both of which are disposed to be actuated so as to apply desired welding pressure to work interposed between the two electrodes; to provide such arrangements wherein the actuating means for both electrodes is common thereto and wherein cooperating means are provided to insure the proper relation between the distances travelled by the respective electrodes in being brought into engagement with the work.

With the above as well as other and more detailed objects in view, which appear in the following description and in the appended claims, a preferred but illustrative embodiment of the invention is shown in the accompanying drawings, throughout the several views of which corresponding reference characters are used to designate corresponding parts and in which:

2

Fig. 2 is an enlarged view in side elevation of the combination pneumatic-hydraulic mechanism for controlling the movement of the electrodes of the machine of Fig. 1;

Fig. 3 is a top plan view of the structure shown in Fig. 2;

Fig. 4 is a view in longitudinal section of the dual booster unit employed in the structures of Figs. 2 and 3;

Fig. 5 is a fragmentary view in section of an equalizing valve which it is preferred to use with the invention;

Figs. 6, 7, 8, 8A and 8B are views, respectively, of solenoid operated valve mechanisms which may be and preferably are used in connection with the invention;

Fig. 9 is a more or less diagrammatic view of a double check valve, which may be used in connection with the invention;

Fig. 10 is a schematic diagram of penumatic-hydraulic circuits embodying the invention;

Fig. 12 is a view showing the physical relation between the relay coils and contacts shown separated from each other in Fig. 11.

It will be appreciated from a compelte understanding of the present invention that the improvements thereof may be utilized in connection with a wide variety of machines, intended for a corresponding variety of different uses. It is now preferred to utilize the invention to control the movements of the electrodes of resistance welding machines, and in an illustrative but not in a limiting sense, the invention is so disclosed herein.

Figure 1:
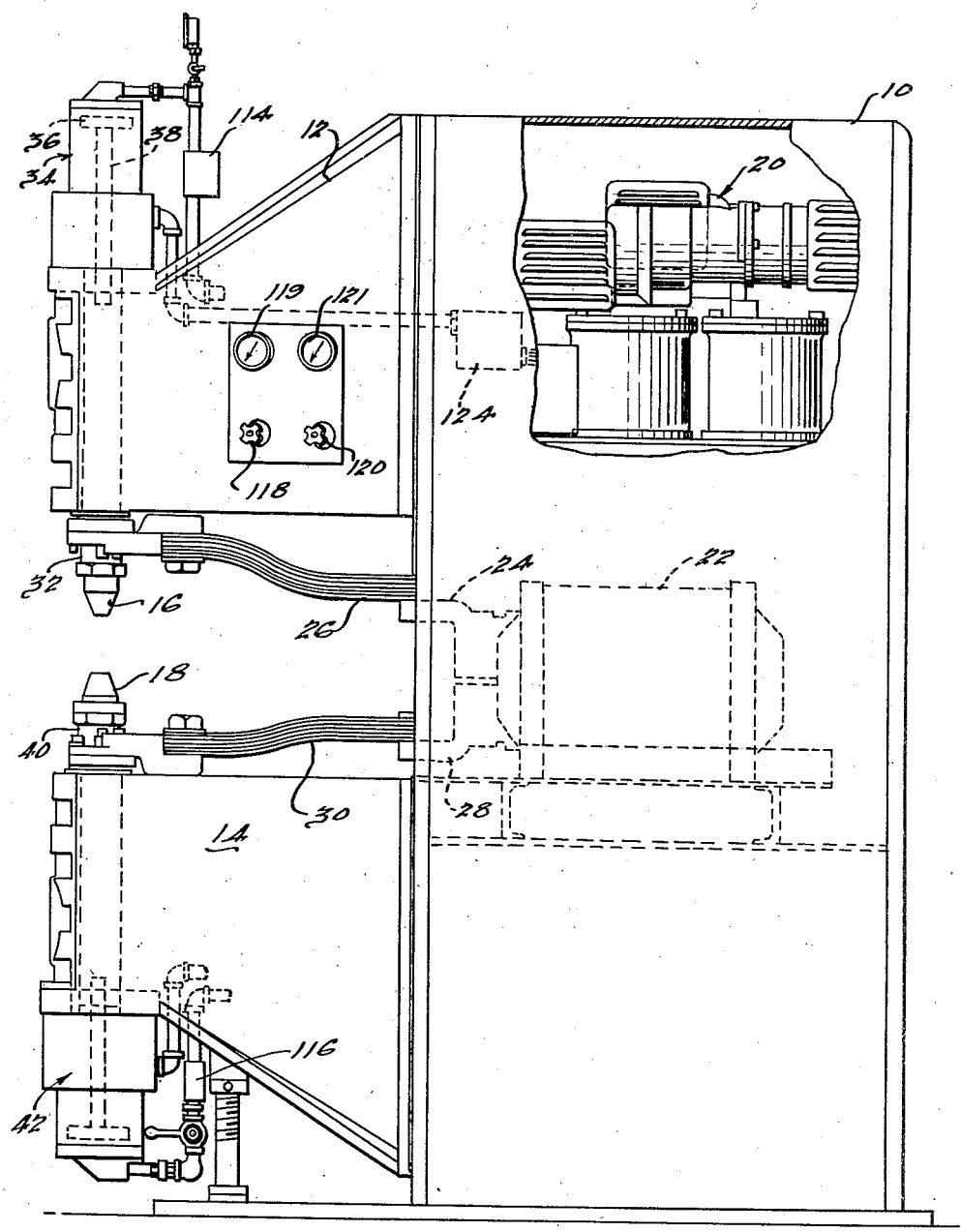
Figure 1 is a view in side elevation of a resistance welding machine embodying the invention.

Referring first to Fig. 1, the illustrated machine is of the vertically arranged press type and is provided with an enclosing frame structure 10, having forwardly projecting electrode supporting horns 12 and 14, which support, respectively, the upper and lower electrodes 16 and 18. The main body of the frame 10 affords space to accommodate the electrode control unit designated as a whole as 20, as well as for the usual welding transformer 22. The electrode 16 is electrically connected to one secondary terminal 24 of the transformer through a flexible bus bar 26, and the lower electrode 18 is similarly connected to the other secondary terminal 28, through a flexible bus bar 30. The holder 32 for the upper electrode is suitably guided for vertical reciprocating movements in bearings (not shown) provided therefor at the front of the horn 12. The horn 12 also carries a double acting hydraulic ram 34, the diagrammatically illustrated piston 36 whereof is connected, through its piston rod 38, to the electrode holder 32. The use of double acting rams for controlling electrode movements is conventional, and it is believed, therefore, that no further illustration is needed of the operative connection between the ram 34 and the electrode 16.

The lower horn is similarly arranged to provide bearings for the holder 40, associated with the lower electrode 18, and this holder is coupled to the piston rod of a double acting hydraulic ram 42 in a manner similar to that described above.

The electrodes 16 and 18 are relatively widely spaced when they occupy their illustrated retracted or starting positions, thus permitting the necessary work to be readily interposed therebetween. An important feature of the present invention resides in movably mounting both the upper and the lower electrodes. In the welding of relatively heavy sections, it frequently becomes necessary to support the work in its movement into and out of the welding throat and all points of the work at which welds are to be made are not necessarily at the same elevation. By making both electrodes movable, these differences in elevation do not require adjustments of the means for supporting the work, since all or any part of the necessary relative electrode movement can be imparted to either or both of the electrodes.

As will be understood, the pneumatic-hydraulic elements of the present system may be variously constructed and may be variously positioned relative to each other, either in the machine or in part at least remotely from it. It is preferred, however, to build these elements together with the operating valves therefor into the previously identified unitary structure, designated as a whole as 20, and positioned, as shown in Fig. 1, within the machine frame.

The unit 20, as shown in more detail in Figs. 2 and 3, comprises a base 50, upon which a pair of cylinders 52 and 54 are mounted. The cylinders are disposed to be normally filled to substantially three-fourths their full capacity with a suitable hydraulic fluid, such as oil, and are provided with an equalizing connection 53, which connects the two adjacent the bases thereof. The equalizing connection 53 includes a double check valve 56 of the ball type, which is shown in more detail in Fig. 5 as comprising a tubular housing 58 into the opposite ends of which nipples 60 are threaded. The nipples 60 are provided with aligned bores 62. A chamber 64 is defined by the area between the inner ends of the nipples 60 and the wall of the housing 58, and this chamber receives a ball 66. It will be appreciated that if pressure is applied to the left-hand end of the valve 56, for example, the ball 66 is thereby seated against the end of the right-hand nipple 60 and closes off the passage therethrough. A pressure applied to the right-hand end of the valve, on the other hand, causes the ball 66 to seat against the end of the left-hand nipple 60 and close off the passage therethrough. So long as the pressures applied to the two ends of the valve, however, are balanced or substantially so, the ball 66 occupies an intermediate position in which it permits a gradual interchange of fluid between the two cylinders 52 and 54. The valve 56 and connection 53 thus serve, under normal inactive conditions, to equalize the levels of the oil in the two cylinders 52 and 54.

The cylinders 52 and 54 serve as a mount for a dual booster unit 70, which is shown in more detail in Fig. 4, as comprising a generally cylindrical end portion 72, to the right-hand end whereof a cooperating cylinder member 74 is secured by means of circumferentially distributed studs 76. The right-hand end portion 77 of the interior surface of the cylinder member 72 is suitably treated to slidably receive a piston 78. Piston 78 is provided with a piston rod 80 which projects into and constitutes the piston associated with a hydraulic cylinder 100. The hydraulic cylinder 100 is defined by a sleeve received in a neck portion 82 which projects axially inwardly from the left-hand end of the cylinder member 72. A spring 84, seated between the end of the cylinder member 72 and piston 78, continuously urges the latter towards the right to a position in which it seats against the end of the cooperating cylinder member 74.

The cooperating cylinder member 74 slidably receives a piston 86, the piston rod 88 whereof projects through the base of the member 74 into abutting relation with the piston 78. A suitable elastic fluid such as air, for actuating the piston 78 may be introduced into the annular cylinder space 90 between the piston 78 and the end of the member 74, through a nipple 92 and a passage 94, which opens into the space 90. Similarly, a suitable elastic fluid, such as air, for the piston 86 may be introduced into the annular cylinder space 96, through the nipple 98. As hereinafter described, the oil cylinder 100 communicates, through suitable regulator valves with the rams 36 and 42, and the normal welding pressure is applied to these rams by admitting air to the cylinder space 96, thereby applying pressure to the oil in the cylinder 100 through the piston rods 88 and 80. The higher welding pressure is afforded by additionally admitting air to the annular space 90, thus proportionately increasing the unit pressure applied to the oil in the cylinder 100.

On the other hand, the movements of the rams 34 and 42, so as to bring the electrodes 16 and 18 into engagement with the work, are effected by admitting air to the upper part of the cylinder 54 through the air inlet line 102. This action circulates oil from the cylinder 54 through the hereinafter described control valve into the electrode rams 34 and 42, and in view of the materially greater oil capacity of the cylinder 54, as compared to the cylinder 100, it will be appreciated that a substantial amount of electrode movement can thus be provided. The return movement of the electrodes from the welding position to the position illustrated in Fig. 1 is effected by admitting air to the cylinder 52, through its inlet connection 104, which action, as hereinafter described, actuates the electrode rams 34 and 42 in the opposite direction.

The valving of the system is controlled by a four-way valve 106, which controls the application to and exhaustion of air from the cylinders 52 and 54; a three-way valve 108, which controls the application to and exhaustion of air from the welding pressure cylinder 96; a three-way valve 110 which controls the application to and exhaustion of pressure from the forging pressure cylinder 90; a three-way valve 112 which controls the inlet line associated with the valve 106; a pair of regulator valves 114 and 116 associated, respectively, with the electrode rams 34 and 42;

a pair of regulator valves 118 and 120 associated, respectively, with the valves 108 and 110, and which serve, consequently, to determine the values of the welding and forging pressures; a two-way hydraulic valve 122, which serves to isolate the electrode rams 34 and 42 from the cylinder 52 at the conclusion of the feed movements of the electrodes; and a two-way check valve 124 associated with the upper electrode ram 34, and which serves to maintain sufficient pressure in this ram during inactive periods of the machine to maintain upper electrode 16 in its elevated position. The valves 106, 108, 110, 112 and 122 may be and preferably are located immediately adjacent the unit 20, as shown in Figs. 2 and 3, and may, as will be understood, be supported by the associated piping. The two regulator valves 118 and 120, which determine the welding and forging pressures, respectively, are preferably carried by the upper horn 12 of the machine and are provided with exposed operating handles, by which these pressures may be conveniently adjusted. Suitable gauges 119 and 121 may, as will be understood, be located adjacent these valves to afford an indication of the various pressure settings. The regulator valves 114 and 116 are preferably located immediately adjacent the associated rams 34 and 42 as is shown in Fig. 1. The check valve 124 may be and preferably is located immediately adjacent the ram 34 so as to enable its ready adjustment.

As will be understood, the above identified valves may be variously constructed, illustrative constructions being shown in Figs. 6, 7, 8, 8A, 8B, and 9. Referring first to Fig. 6, a usual three-way valve construction (which may correspond to the valves 108, 110 and 112) is shown as comprising an enclosing housing 130, provided with upper and lower inlet nipples 132 and 134, which receive threaded nipples 136 and 138. A tubular valve element 140 is secured in place between the nipples 136 and 138, and is provided with an intermediate dividing wall 142, which divides it into two tubular portions 144 and 146. A series of openings 148 is positioned immediately above the wall 142 and a similar series of openings 150 is positioned immediately therebelow. A valve element 152 is slidably fitted over the member 140, and is normally held in its illustrated upper position by a spring 154. In this upper position, the valve element closes off the openings 148, but exposes the openings 150 to exhaust, through the housing 130. The valve element 152 is embraced by a forked operating lever 156 which engages in an annular recess 158 in the valve element. Lever 156 is pivoted to the housing at 160 and is disposed to be operated by the armature 162, associated with the electromagnet 164. It will be understood that if the lever 156 is pivoted in a counterclockwise direction, it forces the valve element 152 downwardly against the force of the spring 154 and bridges the two series of openings 148 and 150, thereby connecting the nipple 136 to the nipple 138. When the electromagnet 164 is de-energized, however, the spring 154 is enabled to return the parts to the illustrated positions in which the nipple 138 is connected to exhaust and the nipple 136 is closed off. The four-way valve shown in Fig. 7 is similar to the above-described three-way construction, but comprises an inlet 170 which communicates with the bore 172 in a stationarily mounted plug 174. A tubular member 176, which may correspond to the previously described tubular member 140, is seated between the nipple 178 and the upper side of the plug. A similar tubular member 180 is seated between the lower surface of the plug and the lower nipple 182. The upper tubular member 176 is provided with a vertically slidable valve element 184 which corresponds to the previously described valve element and is similarly associated with the pivotally mounted operating arm 186. The lower tubular element is provided with a slidable valve element 188, which is like the valve element 184 except that it does not have the annular recess for cooperation with the arm 186. The valve elements 184 and 188 are interconnected by a sleeve 190, and so move as a unit. These elements are continuously urged to their illustrated upper positions by a compression spring 192. In the illustrated position, the upper valve element bridges the circumferentially disposed openings 194 and 196 associated therewith, and thus connects the upper nipple 178 to the inlet 170. On the other hand, the lower valve element 188 is in its upper position in which it isolates its series of openings 198 from the companion series 200, thus closing off the nipple 182 from the inlet 170. In this position of the parts, also, the lower series of openings 200 is exposed so that the nipple 182 is connected to exhaust through the housing. If the electromagnet 202 is energized, on the other hand, the valve elements 184 and 188 are moved downwardly to positions in which the openings 194 and 196 are isolated from each other, the openings 194 are exposed and so connect the nipple 178 to exhaust, and the openings 198 and 200 are bridged so as to connect the nipple 182 to the inlet 170.

The two-way hydraulic valve 122 is illustrated in Figs. 8, 8A and 8B as comprising an enclosing housing 210, which receives an electromagnet 212, armature 214 whereof is pivotally connected by levers 216 and 218 to a cam shaft 220, which projects into a valve body 222. The lever 218 is continuously urged to the illustrated position by a torsion spring 224, in which position the cam carried by the pin 220 enables the spring 226 to hold the poppet type valve 228 in the closed position. If the electromagnet 212 is energized, on the other hand, pin 220 is rocked in a direction to force the valve 228 open against the force of the spring 226. It will be understood that the valve 212 is so positioned in its associated line that the oil flows which are intended to be blocked by it act against the valve element 228 in a direction to hold it closed.

The remaining valve 124 is diagrammatically shown in Fig. 9 as comprising a rectangular housing 240, which is drilled and plugged to provide a series of four passages 242, 244, 246 and 248, which afford two parallel passages through the valve. The passage 242 receives a spring-pressed ball valve 250, which is normally held upon its seat 252 by a spring 254. The passage 246 receives a ball valve 256 which is normally held on its seat 258 by a spring 260. The valve 124 is interposed in the return line from the upper electrode cylinder 34 in the manner shown in Fig. 10, with the nipple 262 connected near the ram and the other nipple 262 connected away from the ram. The spring 254 is heavy enough to prevent a flow from the ram 34 through the line 266 and the passage 242 when the system is inactive, at which time the only pressure applied to this circuit is represented by the weight of the upper electrode structure, the piston and piston rod of the ram 34 and the weight of the oil which is beneath the piston of the ram 34. Such flow is entirely prevented, of course, through the passage 246 by the valve 256. If, however, as described below, such pressure is exceeded, the valve 250 is removed from its seat, allowing a downward movement of the piston associated with the ram 34. A reverse or upward movement of the piston associated with the ram 34 is readily permitted past the valve 256, since the spring 260 associated therewith only lightly maintains valve 256 in seated relation.

Figure 11:
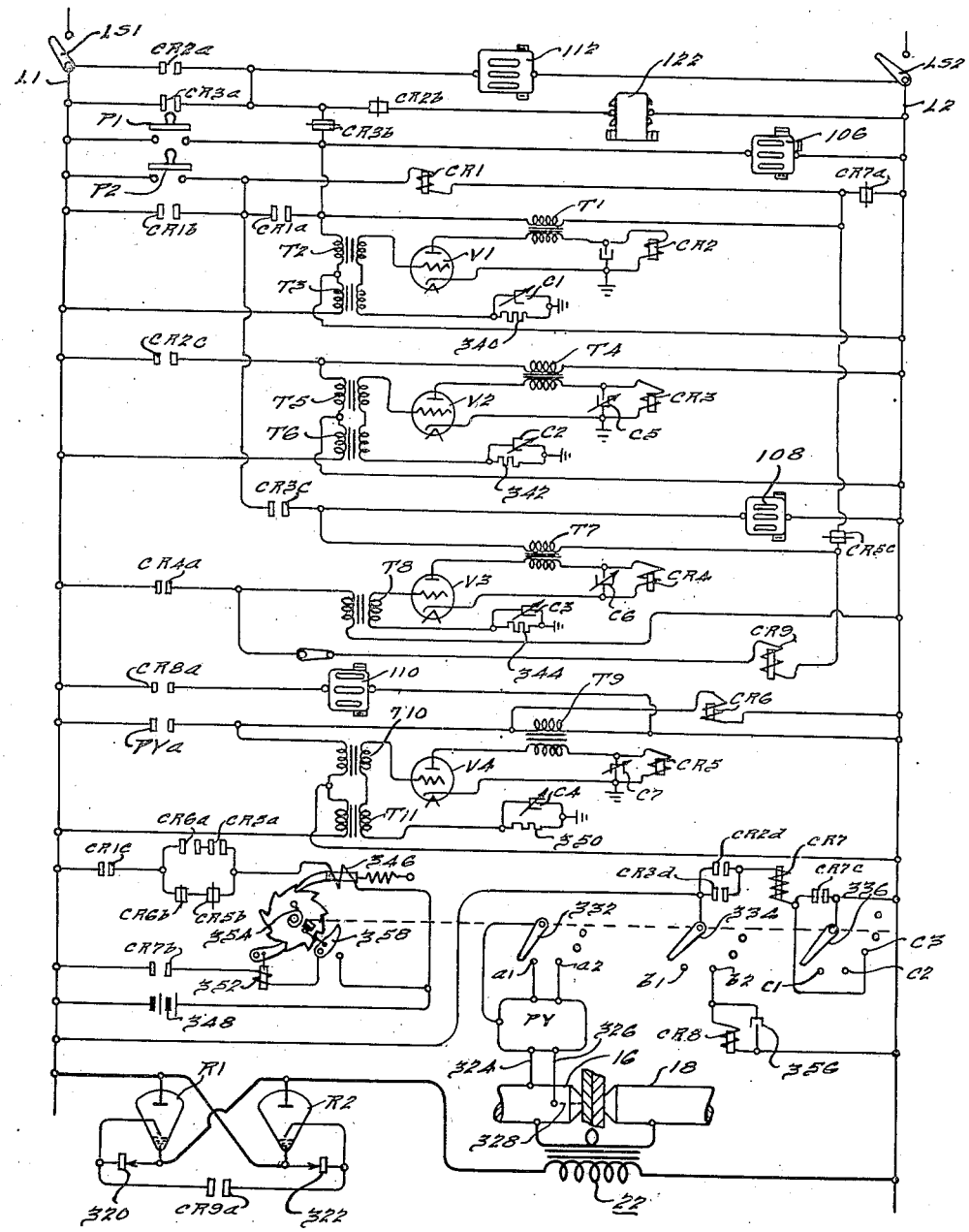
Fig. 11 is a diagrammatic view of electrical control circuits which may be utilized in the practice of the invention.

The air and oil circuits of the present system are shown diagrammatically in Fig. 10, and an electrical control system arranged to provide the proper sequence for the system of Fig. 10 is shown in Fig. 11. It is believed that the remaining details of the system may best be understood by a description of Figs. 10 and 11. Referring first to Fig. 10, air at a suitable pressure such, for example, as ninety pounds per square inch, is admitted through a supply line 270 and through suitable strainer, filter and oiler elements 272 and 274, to a line 276, from which branches 278 and 280 extend to the regulator valves 118 and 120 and the three-way control valve 112. Valve 120 is connected through lines 282 and 284 and the three-way control valve 110, to the high pressure cylinder 90 of the booster 70. Similarly, valve 118 is connected through lines 286 and 288 and control valve 108, to the low pressure cylinder 96 associated with the booster.

The oil cylinder 100 of the booster is connected, through line 290 and branch lines 292 and 294, with the upper and lower ends, respectively, of the electrode rams 34 and 42, which branch lines include the regulator valves 114 and 116.

The branch line 294 is also connected to line 296 which is connected in turn to the cylinder 52 and includes the two-way valve 122.

The remaining cylinder 54 is connected through oil line 298 and branch lines 300 and 302 into the rams 34 and 42 at points below and above the pistons thereof, respectively. The branch line 300 includes the previously mentioned double check valve 124.

In the normal or inactive position of the machine, the piston of the ram 34 is elevated and the piston of the ram 42 is at its lower position. Under these conditions, check valve 124 prevents a flow out of the ram 34 through the line 266, and ram 34 and its associated electrode 16 are, consequently, maintained in their upper positions. The weight of the lower electrode structure and the movable parts of ram 42, on the other hand, maintain these members in their lower positions. Cylinders 52 and 54 are normally filled, as aforesaid, with oil to approximately the level of the usual floats 55 and 57 therein, which levels are maintained equalized by the previously described equalizing valve 56. The oil lines extending between the cylinders 52 and 54, the booster 70 and the rams 34 and 42 are, of course, filled with oil.

Under the conditions stated, further, valves 112 and 106 are de-energized so that, consequently, the air spaces above the oil in the cylinders 52 and 54 are connected to exhaust. The exhaust connection for the cylinder 52 is made directly through the housing of the valve 106, as described above, whereas the exhaust connection for the cylinder 54 is made through the valve 106 and the housing of the valve 112. Further, the valves 108 and 110 are in the de-energized condition, so that the cylinder spaces 90 and 96 of the ram 70, associated therewith, are connected to exhaust. At the same time, the hydraulic valve 122 is in its closed position, in which it is effective to prevent a return flow of fluid from the lines, such as 290 and 292, into the cylinder 52. Such a return flow through the line 294 to the underside of the piston associated with the ram 42 is prevented by the weight of the moving parts associated therewith.

Assuming it is desired to effect a welding operation, the work may be positioned between the upper and lower electrodes 16 and 18 and, as aforesaid, the positioning of the work may be such that it is unequally spaced from the two electrodes. To cause the electrodes to clamp the work, the valves 112, 106 and 122 may be simultaneously energized, as described in connection with Fig. 11. The energization of valve 122 completes the oil circuit from the cylinder 52 to the two rams 34 and 42. The energization of valve 112 connects the air line 304 to the source 270. The energization of valve 106 connects the air space above the oil in the cylinder 54 to exhaust and connects the air space above the oil in cylinder 52 to line 304 through line 306. The pressure thus built up in cylinder 52 forces the equalizer valve 56 to the closed position and also causes a flow of oil through lines 296, 292 and 294 to the rams 34 and 42. A similar pressure is applied to line 290, but no movement of the booster 70 results therefrom, since the pistons thereof are at limit positions. If any leakage has occurred to partially empty cylinder 100 during the idle period of the machine, such leakage is, of course, immediately replaced by the initial flow from cylinder 52. To accommodate any such leakage, a drain line 301 containing a usual check valve 303 may be connected between the cylinder 52 and the sump 305 of the booster unit 20.

The flow to rams 34 and 42 occurs at relative rates determined by the adjustments of the regulator valves 114 and 116 and it will be appreciated that these rates may be adjusted not only to compensate for the normal tendency, due to gravity, of ram 42 to stay in its lower position and for ram 34 to move to its lower position, but may also be adjusted to provide any desired ratio between the rates of travel of the rams toward the work engaging position. In most cases it is preferred to use an adjustment which causes the rams 34 and 42 to move at approximately the same rate. Assuming the spacing between the work and the respective electrodes is unequal, one or the other of the electrodes engages the work prior to its engagement by the other electrode. When such engagement occurs, a resistive pressure is applied to such engaging electrode which interrupts its further movement. The movement of the other electrode, however, continues until it engages the work and it will be understood that the initial engaging pressure of the electrodes against the work is determined by the unit pressure applied to the cylinder 52 through the line 306. During such downward and upward movements of the rams 34 and 42, respectively, oil is discharged from the under and upper sides of the pistons thereof through lines 300, 302 and 298 into cylinder 54. It will be understood that the pressure applied to ram 34 through the line 292 is effective, as aforesaid, to overcome the resistance of the valve 124 to such flow.

After the electrodes have engaged the work, the hydraulic valve 122 is de-energized, which action interrupts the hydraulic circuit between the cylinder 52 and the rams 34 and 42, thereby preventing an escape of oil from these rams and serving to maintain the electrodes in engagement with the work.

At the same time, or shortly after the valve 122 is de-energized, the low pressure booster valve 108 is energized, connecting the low pressure cylinder 96 of the booster 70 to the source of air supply through the regulator valve 118. As soon as this action occurs, pressure is applied to the oil in the booster cylinder 100 through the pistons 86 and 78, which pressure is transmitted to the rams 34 and 42 through the lines 290, 292 and 294. This action immediately increases the pressure applied between the electrodes by an amount determined by the boosting ratio of the booster 70.

The high pressure booster valve may be actuated at a desired stage of the welding operation, depending upon the character of the welding process employed. The electrical control system of Fig. 11 is one which is adapted to practice the process disclosed and claimed in the copending application of Leathers and Benkert, Serial No. 447,006, filed June 15, 1942, as a continuation of their earlier application, Serial No. 422,036, filed December 8, 1941. In this process, the welding cycle includes one or more successive stages, each stage being made up by a controlled heating period and a controlled cooling period. With this process, it is preferred to employ the aforesaid lower welding pressure, as determined by valve 108, throughout the heating part of each stage, and to employ a higher or forging pressure, throughout the cooling part of each stage. Accordingly, with such process the energization of valve 110 is delayed for a suitable period after the energization of valve 108. The energization of valve 110 connects the forging pressure cylinder space 98 of the ram 70 to the source of air supply through the regulator valve 120 and, consequently, increases the pressure applied between the electrodes by an amount determined by the pressure built up in such cylinder space.

In case the cycle includes a succession of stages, the valve 110 may be energized and de-energized a plurality of times, being energized at the beginning of the cooling part of each stage and being de-energized again at the beginning of the heating part of the following stage.

At the conclusion of the weld, the valves 108 and 110 are de-energized, which relieves the forging and welding pressures on the electrodes and initiates a reduction in the pressure between them to the value initially determined by cylinder 52. At the same time, or very shortly thereafter, the four-way valve 106 is de-energized and the hydraulic valve 122 is re-energized, valve 112 being retained for the time being in the energized condition. The de-energization of valve 106 connects the air space in cylinder 52 to exhaust, and connects the air space in cylinder 54 to the source through valve 112. The consequent air pressure in cylinder 54 closes valve 56 in its opposite position and causes a return flow of oil therefrom to the rams 34 and 42, causing these rams to reassume their normal positions in which the electrodes are separated from the work. This return flow is accompanied by a return flow through lines 292 and 294, the now open valve 122 and line 296 to cylinder 52.

At the conclusion of the just-mentioned return movement of the electrodes, valves 112 and 122 are de-energized. These actions again close off the line 296 and prevent a circulation of oil from the lines 290 and 292 into the cylinder 52 and also connect the air space in cylinder 54 to exhaust, thereby relieving the air pressure therein and enabling the equalizer valve 56 to equalize the oil levels in the two cylinders. The system is thus returned to its normal condition in readiness for another cycle.

In certain cases it is desirable to employ the present system with one or the other of the electrodes retained in a stationary position. As shown in Fig. 10, a shut-off valve 310 is associated with the lower ram 42 and it will be understood that if this valve is closed, ram 42 remains continuously in its lower position, the only movable electrode being the upper electrode associated with ram 34.

It will be appreciated that in the broader aspects of the invention various different control systems may be associated with the above described machine, it being preferred, as aforesaid, to use the machine to practice the process of the aforesaid copending application. Fig. 11 illustrates diagrammatically sufficient circuits to afford an understanding of such operation. In Fig. 11 the electrodes 16 and 18 are shown as connected to the welding transformer 22 in the previously described manner and current flow to the electrodes is controlled by a pair of electric discharge devices R1 and R2, which may be and preferably are of the type sold commercially under the trade-name "Ignitrons," the operation whereof is well understood. The discharge devices R1 and R2 are provided with a conventional excitation circuit comprising auxiliary rectifiers 320 and 322 and the normally open contact CR9a of a usual electromagnetic control relay. It will be understood that so long as contact CR9a is open, the devices R1 and R2 are nonconductive and that, consequently, no current is supplied to the welding transformer 22.

Cooperating with relay CR9 is a similar series of usual electromagnetic relays CR1 through CR8, the contacts whereof bear similar designations with the postscripts $a$, $b$, etc. The system further includes a series of usual three-element electronic valves V1, V2, V3 and V4, all of which may be and preferably are of the high vacuum or continuous control type. The system further includes a pyrometer unit which is described in detail in the aforesaid copending application and is shown diagrammatically only in Fig. 11. The unit is designated PY and is provided with a single contact PY$a$, which is open so long as the thermoelectric potential applied between the input leads 324 and 326 is below a predetermined value. These contacts close when, and remain closed so long as, this potential exceeds the just-mentioned value. The thermoelectric potential is developed between the leads 324 and 326 by forming a thermocouple between the electrode 16 and a suitable element 328 embedded therein, all as described in said copending application. Cooperating with the pyrometer is a ratcheting unit 330, which may be of a conventional type and is diagrammatically shown. This ratcheting unit is provided with a series of movable arms 332, 334 and 336, which cooperate with series of associated contacts to adjust the heat setting of the pyrometer, to control the application to and removal of the forging pressure and to effect the resetting of the system at the conclusion of a welding operation. The initiation of a welding operation is under the control of a two-stage switch, shown as made up of two separately operable push buttons P1 and P2.

It is believed the remaining details of the system may best be understood by a description of the operation thereof.

To place the system in condition for operation, the illustrative disconnect switches LS1 and LS2 may be closed, thereby connecting the supply conductors L1 and L2 to a suitable source of alternating current. Energization of the line conductors L1 and L2 is without immediate effect other than to complete circuits for transformers T3, T6 and T11, associated with the grid circuits of valves V1, V2 and V4. Upon being energized, these transformers apply blocking potentials to the grids of these valves, thereby preventing current flow therethrough, and also charge up the grid control condensers C1, C2 and C4, associated therewith.

To initiate a welding operation, the first-stage switch P1 may be closed, which action effects the previously described operations of bringing the electrodes into engagement with the work at a pressure determined by the pressure in the cylinder 52 (Fig. 10). More particularly, closure of switch P1 completes obvious energizing circuits in parallel for valves 112, 122 and 106, and for transformers T1 and T2, associated with the anode and grid circuits of valve V1. The circuit for transformer T1 includes the now closed back contacts CR7a of control relay CR7, the circuit for valve 112 includes the now closed back contacts CR3b of control relay CR3, and the circuit for valve 122 includes the last mentioned contacts and also the now closed back contacts CR2b of control relay CR2.

The energization of the three valves 112, 122 and 106 effects the operations previously described, namely, to bring the electrodes into engagement with the work.

The energization of transformer T2 opposes the originally energized transformer T3 and enables the energy originally stored in the grid control condenser C1 to discharge through the indicated local circuit, including resistor 340. At the expiration of a discharge period determined by the characteristics of this circuit, valve V1 becomes conductive and enables the now energized transformer T1 to pass current therethrough and energize control relay CR2. This action causes this relay to close its normally open contacts CR2a, CR2c, and CR2d and to open its back contact CR2b. The latter action de-energizes the two-way hydraulic valve 122, thereby, as aforesaid, trapping sufficient oil in the electrode rams 34 and 42 to maintain the electrodes in engagement with the work with the desired preliminary pressure. It will be understood, accordingly, that the timing afforded by condenser C1 is sufficient to allow for the full travel of the electrodes from their retracted positions to their work engaging positions. The closure of contact CR2a is without effect in the operation now being described, since it is assumed that the switch P1 is still closed. Closure of contact CR2d serves only to prepare a circuit for control relay CR7.

Closure of contact CR2c completes obvious energizing circuits for transformers T4 and T5, associated with the anode and grid circuits of valve V2. Upon being energized, transformer T5 opposes the originally energized transformer T6 and enables the energy originally stored in the associated condenser C2 to discharge through the local circuit including resistor 342. At the conclusion of a relatively short discharge period determined by the characteristics of this circuit, valve V2 becomes conductive and enables the now energized transformer T4 to energize control relay CR3. This action causes this relay to close its normally open contacts CR3a, CR3c and CR3d and to open its back contact CR3b. The latter action is without effect since the now closed contacts CR3a and CR2a complete parallel circuits which retain the valve 112 energized. The closure of contact CR3c prepares circuits for the welding pressure control valve 108 and for the plate transformer T7, associated with valve V3 and control relay CR4, which circuits, however, remain incomplete, since the second-stage starting switch P2 is still open. So long, therefore, as switch P1 is retained closed, the electrodes 14 and 16 remain in engagement with the work with the preliminary contact pressure. Closure of contact CR3d is without effect other than to further condition the circuit for control relay CR7.

To actually initiate the weld, the second-stage switch P2 may be closed and this action may be caused to take place substantially simultaneously with the closure of switch P1 or after an interval thereafter. If the closure of switch P2 takes place substantially simultaneously with the closure of switch P1, the actuation of the welding pressure relay 108 and the just-mentioned transformer T7 is, nevertheless, delayed long enough to allow for the movement of the electrodes into engagement with the work, which time interval is afforded by the delay in the closing movement of the last-mentioned relay contact CR3c. This latter delay, as aforesaid, is controlled by condenser C2.

The closure of switch P2 completes an obvious energizing circuit for the winding of control relay CR1, which thereupon closes its normally open contacts CR1a, CR1b and CR1c. Closure of contacts CR1a and CR1b completes self-holding circuits in parallel with the switches P1 and P2, which may thereupon be released to the open position without interrupting the welding cycle. The closure of switch P2 and of contact CR1b also completes the previously traced circuit for the welding pressure valve 108, which thereupon operates, as described with reference to Fig. 10, to apply the normal or welding pressure to the electrodes 14 and 16. The effect of contact CR1c is described below.

The circuit for transformer T7 is completed simultaneously with the completion of the circuit for valve 108. Upon being energized, transformer T7 applies potential to valve V3. Under the conditions stated, valve V3 is conductive and transformer T7 is, consequently, enabled to energize control relay C4. Upon being energized, control relay C4 closes its normally open contact CR4a, thereby energizing the welding control relay CR9. Upon being energized, relay CR9 closes its sole contact CR9a and actuates the power contactor represented by the reversely connected main rectifiers R1 and R2. This action, as will be understood, initiates the flow of welding current to the work.

Closure of contact CR4a also energizes the grid transformer T8, associated with valve V3, and enables it to apply a blocking potential to valve V3. This action interrupts the supply of energizing current to control relay CR4, whereupon the energy stored in the winding thereof starts to discharge through the associated condenser C6. At the expiration of a so-called "heat" period following this action control relay CR4 resumes its original de-energized position and opens contact CR4a. This action de-energizes the welding relay CR9, which thereupon interrupts further flow of welding current to the work. The opening of contact CR4a also enables the energy stored in condenser C3 to start discharging through the associated local circuit including resistor 344, and at the expiration of a "cool" period, valve V3 again becomes conductive, enabling transformer T7 to re-energize relay CR4. This re-energization again initiates the flow of welding current, as before, and also applies a blocking potential to valve V3. Control relay CR4 therefore pulsates between the energized and de-energized conditions, current being supplied to the welding circuit so long as relay CR4 is energized, and being interrupted so long as relay CR4 is de-energized. It will be understood that the heat and cool intervals are adjustable in length and are proportioned to suit the work being welded.

Reverting to the energization of control relay CR1, closure of contact CR1c thereof completes a circuit through the now closed back contacts CR5b and CR8b of relays CR5 and CR8, respectively, to thereby connect the operating winding 346 of the ratchet unit 330 to a suitable source of direct current illustrated as a battery 348. Upon being energized, winding 346 operates its armature and causes the ratchet unit to advance one notch from its initial or starting position to its first operating position in which the arms 332, 334 and 336 are in engagement, respectively, with terminals a1, b1 and c1. In the sequence now being described, terminals b1 and c1 are idle, but terminal a1 adjusts the pyrometer PY to respond to a temperature corresponding to the critical welding temperature of the work.

The current supplied to the work during the successive "heat" periods gradually elevates the temperature of the work, and when a critical temperature is reached, a weld nugget is formed between the two workpieces. When this temperature is attained, the thermoelectric potential between the pyrometer leads 324 and 326 is sufficient to cause this element to close its sole contact PYa. Closure of contact PYa completes obvious energizing circuits in parallel with each other for control relay CR6 and for transformers T9 and T10, associated with the anode and grid circuits of valve V4. Upon being energized, relay CR6 closes its contact CR6a and opens its contact CR6b. The latter action interrupts the previously traced circuit for the operating winding 346 of the ratchet unit, which action does not advance the ratchet unit but does allow a return movement of the armature to a position in which it engages the next successive tooth of the ratchet member. Upon being energized, transformer T10 opposes transformer T11 and enables the energy stored in condenser C4 to start discharging through the local circuit including resistor 350. At the expiration of a short discharge period just sufficiently long to allow the above mentioned return movement of the armature associated with the ratchet operating winding 346, valve V4 becomes conductive and enables transformer T9 to energize control relay CR5.

Upon being energized, relay CR5 closes its contact CR5a and opens its contact CR5b. The former action completes a circuit through the now closed contacts CR1c and CR6a for the operating winding 346, which thereupon moves the ratchet unit 330 to its second operating position in which the arms 332, 334 and 336 are in engagement with terminals a2, b2 and c2, respectively. Terminal c2 is an idle terminal in the sequence now being described, but the movement of arm 332 onto terminal a2 readjusts the pyrometer setting to a relatively low temperature corresponding, for example, to a temperature well below the annealing temperature of the work. As described in the aforesaid copending application, the pyrometer is sluggish enough in its action to retain the contact PYa closed during the transition movement of the arm 332 from terminal a1 to terminal a2. As soon, of course, as terminal a2 is engaged the pyrometer readjustment takes place and the pyrometer is thus effective to maintain the contact PYa closed until the temperature of the work falls to the aforesaid relatively low value.

The movement of arm 334 into engagement with terminal b2 completes an obvious energizing circuit for the winding of control winding CR8, which thereupon closes its sole contact CR8a and completes an energizing circuit for the high pressure or forging valve 110. Upon being energized, as described in connection with Fig. 10, valve 110 increases the electrode pressure to the maximum or forging value.

The above-mentioned energization of control relay CR5 also causes its contact CR5c to open, which action immediately de-energizes transformer T7 and the welding current relay CR9. The de-energization of the welding current relay CR9 interrupts further flow of welding current to the work and it will be understood, therefore, that the attainment of the welding temperature in the work results in the interruption of the flow of welding current and further results in the application to the work of the higher or forging pressure.

The de-energization of transformer T7 also causes relay CR4 to resume the de-energized condition after the timing out of condenser C6, as aforesaid. This action is without effect in the sequence being described in view of the fact that control relay CR9 is now in the de-energized condition. It will be noted that if the energization of control relay CR5 takes place during a "cool" period between successive pulsating flows of welding current, such action serves merely to prevent the re-energization of relay CR4 and CR9 at the expiration of the "cool" period in question.

When the work temperature falls to the aforesaid relatively low value, at which temperature the weld may be expected to have solidly set, so that the electrode pressure may be relieved, the pyrometer PY releases its contacts PYa to the open position. This action immediately de-energizes control relay CR6 and transformers T9 and T10. The deenergization of control relay CR6 causes its contact CR6a to reopen and its contact CR6b to reclose. The latter action is without effect, since contact CR5b is still open, but the former action again interrupts the circuit for the ratchet operating winding 346. This action does not cause an advancing movement of the ratchet unit, but it does allow the armature of winding 346 to be withdrawn to a position in which it engages the next successive ratchet tooth.

The de-energization of transformer T10 enables transformer T11 to again apply a blocking potential to the grid of valve V4. This action coupled with the de-energization of transformer T9 interrupts the supply of energizing current for the winding of relay CR5 and enables the energy stored in the winding thereof to start discharging through the associated condenser C7. After a short period of the order, for example, of several cycles of the source, relay CR5 resumes the deenergized position. This interval is long enough, as will be understood, to enable the just-mentioned return movement of the armature associated with the ratchet operating winding 346.

Upon being de-energized, relay CR5 opens its contact CR5a, without effect, and also recloses its contact CR5b. This action re-energizes the ratchet operating winding 346 and enables it to advance the ratchet unit to its third position in which the arm 336 engages the terminal c3. This action also moves the arms 332 and 334 out of engagement with their terminals a2 and b2. The former action is without effect, since the pyrometer contact PYa is already open, but the latter action interrupts the circuit for the high pressure control relay CR8. Upon being so de-energized, control relay CR8 interrupts the circuit for the high pressure valve 110 which, as described in connection with Fig. 10, thereupon acts to relieve the high or forging pressure from the electrodes.

The engagement of arm 336 with terminal c3 completes a circuit for the winding of control relay CR7, (through now closed contacts CR2d and CR3d) which thereupon opens its contact CR7a and closes its contacts CR7b and CR7c. Contact CR7b completes a circuit for the reset winding 352, associated with the ratchet unit 330, which thereupon withdraws its armature from engagement with the ratchet teeth and enables the return spring 354 to restore the ratchet unit to its initial or starting position in which arms 332, 334 and 336 occupy their illustrated inactive positions. When the ratchet unit reaches its starting position, the limit switch 358 is opened thereby, which action interrupts the circuit for the reset winding 352.

During the return movement of the ratchet unit, the arm 332 sweeps over the terminals a2 and a1, which action is, however, without effect, since the work is now at a temperature below the temperatures at which these terminals respond. During this return movement, also, the arm 334 sweeps over the terminal b2, but the period of this energization is too short to enable relay CR8 to become re-energized. If desired and as shown, a delaying condenser 356 may be connected in parallel with the winding of relay CR8.

The return movement of the arm 336 interrupts the original circuit for relay CR7. Closure of contact CR7c, however, completes a self-holding circuit for relay CR7, so that such movement of arm 336 is without effect.

As to resetting actions, the opening of contact CR7a directly interrupts the energizing circuits for control relay CR1, transformer T1, transformer T7 and control relay CR9. It is noted that the de-energization of relay CR5 at the conclusion of the cooling down of the work also caused its contact CR5c to reclose, which action tends to recomplete the circuit for transformer T7 and for control relay CR9. The de-energization of relay CR5, however, and as aforesaid, also causes the energization of relay CR7, which, at contact CR7a, prevents recompletion of these circuits. In practice, it is found that, in view of the relatively heavier character of at least control relay CR9, contact CR7a takes effect before relay CR9 is re-energized. Thus, contact CR5c, in reclosing, is ineffective to re-initiate a flow of welding current to the work. If desired, of course, such proper sequencing can be further insured by interposing a slight delay in the closing movement of contact CR5c, so as to cause the closing of this contact to lag behind the reclosure of contact CR5b.

Continuing with the resetting action, the deenergization of relay CR1 causes its contacts CR1a, CR1b and CR1c to reopen. The latter contact de-energizes the operating winding 346 of the ratchet unit. Contact CR1a and contact CR1b, in opening, further interrupt the circuit for transformer T1 and also interrupt the previously traced holding circuit in parallel with the pilot switches P1 and P2. In addition, the opening of contact CR1b interrupts the circuit for the welding pressure valve 108, which thereupon, as described in connection with Fig. 10, relieves the welding pressure from the work and restores this pressure to the initial low value.

The opening of contacts CR1a and CR1b also interrupts the remaining energizing circuit for the winding of the four-way valve 106, associated with the two cylinders 52 and 54, thereby connecting cylinder 52 to exhaust and connecting the return cylinder 54 to the source of air pressure. This action is preparatory to the return or separating movements of the electrodes.

The de-energization of transformer T1 de-energizes control relay CR2, which thereupon resumes the de-energized condition, opening its contacts CR2a, CR2c and CR2d and closing its contact CR2b. The opening of contacts CR2a and CR2d is without immediate effect, but the closure of contact CR2b recompletes a circuit for the two-way hydraulic valve 122, which thereupon functions, as described in connection with Fig. 10, to enable the separating movements of the electrodes under the influence of the air pressure now applied to cylinder 54.

The opening of contact CR2c interrupts the circuits for transformers T4 and T5, associated with valve V2, and control relay CR3. These actions cooperate to interrupt the further flow of energizing current to control relay CR3, whereupon the energy stored in the coil thereof starts to discharge through the associated condenser C5. At the expiration of a relatively short period, sufficiently long to enable the full separating movement of the electrodes to take place, relay CR3 resumes the de-energized position, opening its contacts CR3a, CR3c and CR3d, and reclosing its contact CR3b. The opening of contact CR3c and the closure of contacts CR3b are without effect, since the associated circuits are open at other points. The opening of contact CR3a interrupts the only remaining energizing circuits for valves 112 and 122. Upon being de-energized, valve 122 closes off the line 296, as aforesaid, and valve 112 relieves the air pressure applied to cylinder 54 through the now de-energized valve 106. The opening of contact CR3d interrupts the previously traced holding circuit for relay CR7, which thereupon resumes the de-energized position without effect. These resetting operations, therefore, serve to restore the system to its normal condition, in readiness for the next welding operation.

In certain cases it is found necessary, after initially moving the electrodes into engagement with the work, to again separate them before initiating the actual welding operation. Such an action can readily be accomplished by closing pilot switch P1, without closing pilot switch P2, and by thereafter releasing pilot switch P1. It will be recalled from previous description that closure of pilot switch P1 first energizes valves 112, 122 and 106 to thereby cause the electrodes to start towards the work engaging positions. Also, by causing the energization of relays CR2 and CR3, pilot switch P1 causes the two-way hydraulic valve 122 to be de-energized after the electrodes engage the work. It will further be recalled that so long as switch P1 is held closed (assuming switch P2 is maintained in the open position), valves 112 and 106 and relays CR2 and CR3 remain energized, and the electrodes engage the work with the relatively light preliminary pressure.

If, under these conditions, switch P1 is reopened, such action immediately de-energizes the four-way valve 106 and also immediately de-energizes transformers T1 and T2. The de-energization of the four-way valve 106 applies air to the cylinder 54, preparatory to the return movement of the electrodes, as aforesaid. The de-energization of transformers T1 and T2 causes relay CR2 to be de-energized. This action causes contact CR2a to reopen and contact CR2b to reclose. The former action is without effect, since contact CR3a is still closed, but the latter action recompletes the circuit for the two-way hydraulic valve 122, which thereupon reopens and enables the return movements of the electrodes, as previously described.

The de-energization of relay CR2 also opens its contact CR2c which, as described in connection with the usual resetting operation, results in the de-energization of relay CR3. This latter de-energization occurs at the end of a period sufficient to allow the full separating movement of the electrodes. When relay CR3 resumes the de-energized position, it completes the resetting action, in the previously described manner, by de-energizing the remaining valves 112 and 122.

As described above, the control system of Fig. 11 provides only a single heating stage and a single cooling stage. It will be understood that, if desired, the indexing unit may be provided with additional terminals, as indicated, so that as described in the aforesaid Leathers and Benkert application, a succession of heating and cooling stages are provided. In such case, it will be understood that the high pressure relay CR3 may be energized during each cooling stage and it will also be understood that the actuation of the resetting relay CR1 is delayed until the end of the final cooling stage. It is thought, however, that the single stage system specifically described above serves to illustrate the operation of the present invention.

Although only a single specific embodiment of the invention has been described in detail, it will be appreciated that various modifications in the form, number and arrangement of the parts may be made without departing from the spirit and scope of the present invention.

What is claimed is:

1. A welding machine having a pair of opposed electrodes, each movable between a retracted position and a work engaging position, means including motive means individual to each electrode for moving them between said positions, a source of power common to said motive means for effecting a said movement to the work engaging position, said source of power including means constructed and arranged to enable the source to continue to move one electrode independently of continued movement of the other electrode, and means for actuating said motive means to retract the electrodes to the retracted positions thereof.

2. A welding machine having an electrode movable between a retracted position and a work engaging position, a hydraulically operated motor for effecting a said movement of said electrode, a reservoir disposed to be in communication with said motor, means for applying an elastic fluid pressure to fluid contained in said reservoir to cause a delivery of such fluid from the reservoir to the motor, and supplemental means operative to increase the hydraulic pressure in said motor after said electrode has reached the work engaging position, said supplemental means including a conduit communicating with the motor and containing hydraulic fluid, piston means for transmitting pressure through the conduit to the motor, and control means for applying an elastic fluid pressure to the piston.

3. In a welding machine, the combination of a work engaging part movable between a retracted position and a work engaging position, a first motive means for effecting a said movement, a second motive means for applying a working pressure to said part while in the work engaging position, and control means for said motive means selectively operable to either actuate only said first-mentioned motive means or to operate both said first and second motive means in sequential relation, and timing means responsive to said control means for interposing a predetermined time delay between the operation of said first and second means.

4. The structure of claim 3 wherein said part is provided with a fluid motor, and said first and second motive means comprise means for supplying said motor with fluid pressure.

5. The structure of claim 3 wherein said part is provided with a fluid motor, wherein said first and second motive means comprise means for supplying said motor with fluid pressure, and wherein means are provided to render the first motive means ineffective while the second motive means is effective.

6. The structure of claim 2 including means operative to prevent a flow of fluid from said motor to said reservoir when said control means is actuated.

HUGO PURAT.